Jan. 15, 1963 H. HUNSDIECKER 3,073,732
PLASTIC ARTICLES AND METHOD OF PRODUCING SAME
Filed March 23, 1959 2 Sheets-Sheet 1
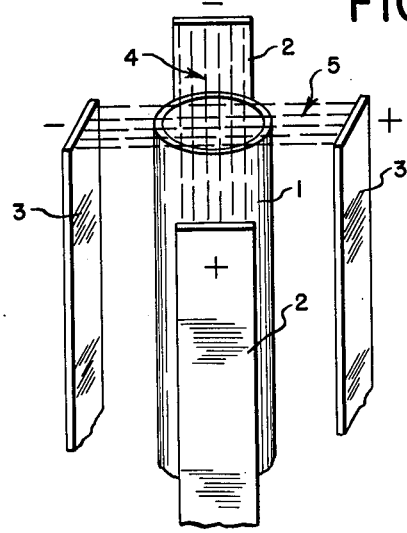
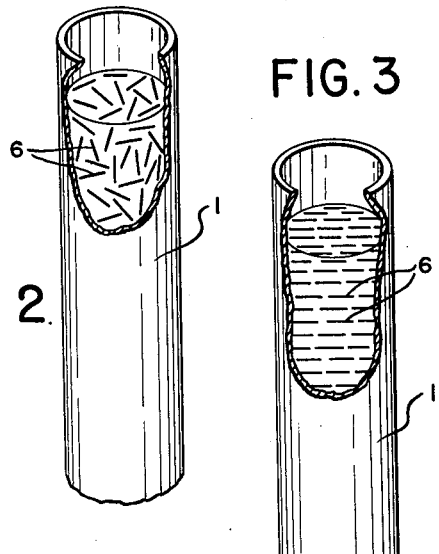
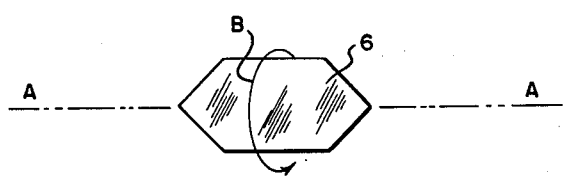
INVENTOR
Heinz Hunsdiecker
ATTORNEYS Jan. 15, 1963     H. HUNSDIECKER     3,073,732
PLASTIC ARTICLES AND METHOD OF PRODUCING SAME
Filed March 23, 1959     2 Sheets-Sheet 2

INVENTOR
Heinz Hunsdiecker
BY
ATTORNEYS

United States Patent Office 3,073,732
Patented Jan. 15, 1963

3,073,732
PLASTIC ARTICLES AND METHOD OF
PRODUCING SAME
Heinz Hunsdiecker, Junkersdorf, near Koln, Germany, assignor to U.S. Plastic and Chemical Corporation, Metuchen, N.J.
Filed Mar. 23, 1959, Ser. No. 800,962
5 Claims. (Cl. 154—43)

One known way of obtaining mother of pearl lustrous effects and/or iridescent effects in synthetic materials such as Celluloid, acetyl cellulose, acrylic acid esters, methacrylic acid esters, so-called polyesters and so forth is by the admixture of plate or rod form crystals of high index of refraction with the synthetic materials. These crystals which exhibit exceptionally high degrees of light reflectivity give an effect which is much used in the button and costume jewelry industries.

A simple admixture of such crystals does not suffice to achieve the desired effect with maximum brilliance or luster. A particular orientation of the crystals in the synthetic material, preferably parallel to the surface of the article, is necessary to impart to the synthetic material maximum brilliance or luster. Obviously cases arise in which this parallel orientation must be substituted by another, say by the orientation of the crystals parallel to a waved surface. In this way certain alternations in the effects are obtained. In order to obtain such orientations, various processes have been proposed. In the process used in the Celluloid industry the plastic mass is pressed through a slit nozzle, the crystals orienting themselves substantially parallel to the direction of flow. A similar method is used in the artificial horn industry in which an extrusion press and a suitable mouthpiece can be used to obtain orientation of the crystals parallel to the surface of the extrusion. By the aid of a deflection nozzle the crystals can be oriented and set perpendicular to the surface of the extrusion to give an approximate cross effect. Synthetic materials such as those based on methylmethacrylate, the so-called polyesters or styrene are also used in a similar process. Here again by a flowing operation shortly before hardening of the mass, the crystals are oriented in a predetermined direction which naturally depends upon the nature of the flow.

It has been proposed to orient crystals which confer a pearl-like lustrous effect and/or an iridescent lustrous effect by exposure to an electric or magnetic field. This is based upon the idea that these crystals have dipole moments either inherently by their nature or induced in them by the action of the electric field. In fact under the effect of a field the crystals become set parallel to the lines of force. But under these conditions only one possible orientation is established because the crystals still have freedom to rotate about the imaginary lines of an axis. Therefore, when the synthetic material has changed from the viscous into the solid or gel condition and the crystals are deprived of all freedom of movement only those crystals which, at the instant of hardening, happened to be in a position which is parallel or approximately parallel to the surface of the article of synthetic material, as for instance a plate or rod, will have the optimum light reflecting characteristics.

It has now been found that the degree of freedom of motion of the crystals still left in the synthetic material can be eliminated in a simple manner by imposing alternately two electric or magnetic fields, the lines of force of which cross preferably at a right angle or approximately at a right angle to each other, but in any case at not too small an angle. If the switching on and off of the fields takes place at relatively short intervals of time the crystals become set parallel to the imaginary network of lines of force and a maximum pearl-like lustrous effect and/or iridescent lustrous effect is obtained.

The term electric field as used herein and in the claims is used in the generic sense and includes both an electrostatic and an electromagnetic field.

The drawings illustrate one manner of performing the process according to this invention in which:

FIG. 1 is a perspective view of a mold having two pairs of electrodes spaced parallel to the long axis of the mold at approximately right angles to each other;

FIG. 2 is a perspective view of a mold containing a resin in which the pearl essence or crystal particles are randomly distributed;

FIG. 3 is a perspective view of a mold containing a resin in which the crystals have been oriented substantially horizontal and parallel to the imaginary lines of force;

FIG. 4 is a plan view of a crystal showing various axes and a possible direction of rotation;

Figure 5:
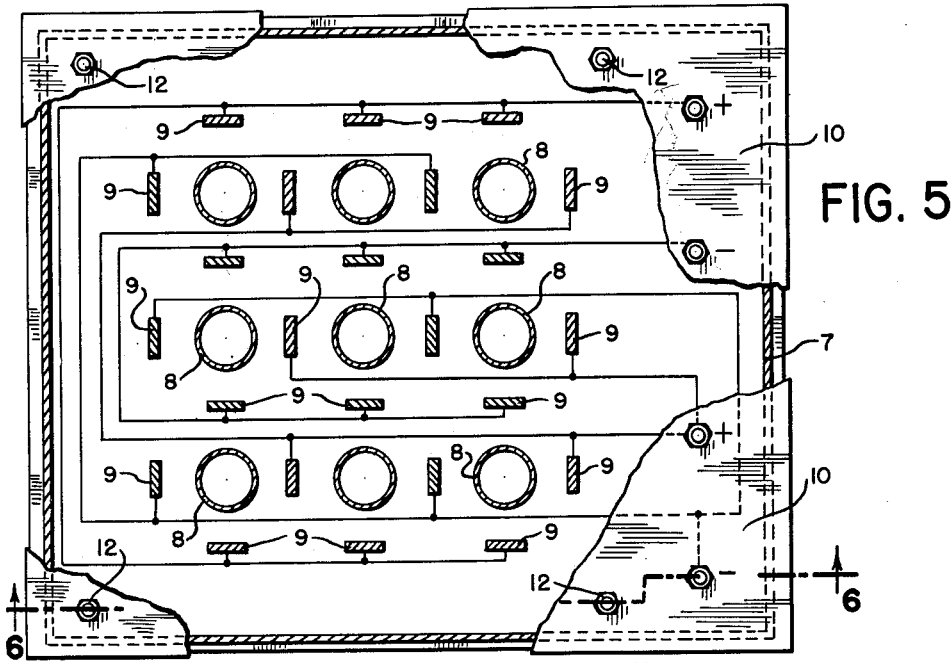
FIG. 5 is a top view of an apparatus which can be used for carrying out the process of this invention embodying a series of molds.

FIG. 1 illustrates the principle of this invention and shows a tubular or cylindrical mold 1 having two pairs of electrodes 2, 2 and 3, 3 spaced from the mold and located at approximately right angles to each other. The electrodes have been designated plus and minus on the drawing and the lines of force created by each pair of electrodes when supplied with suitable potential are generally indicated by the numerals 4 and 5. In practice, the current to the electrodes 2, 2 and 3, 3 is switched on and off alternatively so that the crystals admixed with the resin are alternatively subjected to the fields of force 4 and 5.

FIG. 2 shows a cylindrical mold containing a liquid resin having crystals 6 admixed therewith in a non-oriented condition. Such a haphazard arrangement of the crystals as shown in FIG. 2 results from a purely physical mixing of the crystals in the resin.

The crystals admixed with the resin in FIG. 3 have been oriented according to this invention at least along two axes in substantially the same plane. The subjection of the crystals to the alternating fields of force aligns these crystals (as shown) so that a second axis of the crystals is also aligned substantially parallel to the imaginary lines of force through the resin.

Subjecting the crystals to a single field in one direction would align the crystals along the axis A—A as shown in FIG. 4. The crystals, however, will still have freedom to move about a second axis indicated by the arrow B. By subjecting the crystals to the alternating fields of force, rotation of the crystal in the direction indicated by the arrow B would also be effectively prevented and the crystals aligned and oriented so that the planes of the crystals as shown in FIG. 4 are all oriented and maintained in substantially the same plane.

FIG. 5 shows an apparatus which can be used to carry out the process of this invention using a plurality of molds. This apparatus comprises a container 7 suitable for holding a dielectrum, a series of tubular or cylindrical molds 8 and a corresponding series of electrodes 9 placed at an appropriate distance from the molds at approximately right angles to the molds. The opposite electrodes are charged negatively and positively as shown in the drawings and current is alternatively applied to each pair of electrodes by a suitable timing mechanism not shown.

Figure 6:
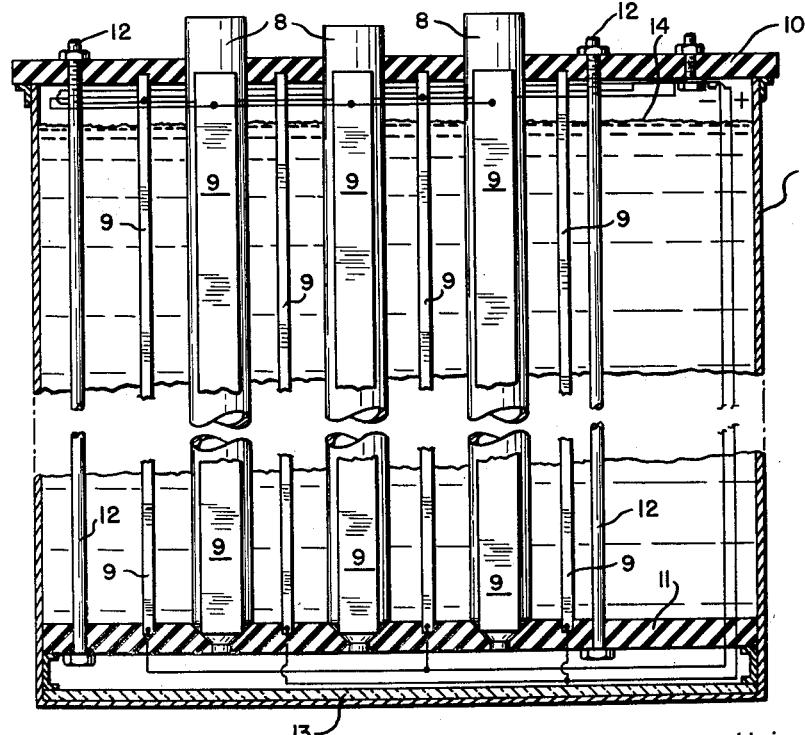
FIG. 6 is a cross-section of FIG. 5 taken along the lines 6—6.

FIG. 6 is a cross-sectional view of FIG. 5 taken along the line 6—6 showing the tubular molds 8 and electrodes 9 connected to a suitable source of power. The top of the mold consists of a suitable insulating cover 10 such as rubber and bolted together with a second rubber sheet 11 at the bottom of the mold by means of bolts 12. A glass sheet 13 may be provided at the bottom of the mold for insulating purposes. The mold is filled with a dielectrum preferably to the level indicated at 14.

The action of the fields must continue until the desired orientation is achieved and the synthetic material has reached a sufficiently solid state so that the crystals remain fixed in position without the further action of the fields.

It is obvious that strong fields will lead to the desired result quicker than correspondingly weaker fields. Therefore electrostatic fields with high potential difference should be used. The field strength which can be used must be short of that which will cause sparking between the condensers or electrodes. A concentration of the lines of force, that is an intensification of the field can be obtained by embedding or immersing the mold containing the synthetic material in a dielectrum which should be non-inflammable.

The following examples will illustrate the process according to the invention.

*Example 1*

A mold is made from glass plates using a suitable sealing material as for example polyvinyl chloride cords and this is filled with a prepared mixture consisting of a commercial polyester, a few percent of suitable pearl essence pigment, e.g. basic lead carbonate, methylethyl ketone peroxide and a cobalt accelerator. Electrodes are positioned in suitable fashion against the narrow sides of the mold so that they do not make contact with one another. The electrodes are then connected pair-wise with a suitable source of current, for example, with the poles of a transformer across which a potential difference of about ten thousand volts is developed. The crystals very quickly orient themselves in the still fluid synthetic material parallel to the surface of the glass plates upon the application of alternating fields of force. After a certain time, which depends upon the quantity of catalysts or accelerators which have been incorporated, the mass gels, whereby the crystals are fixed in their positions. The mold is opened as soon as the plate of synthetic material has sufficient consistency and its hardening is then completed in the usual way.

*Example 2*

The procedure of Example 1 is followed but the mold is immersed in a bath consisting of a suitable chlorinated hydrocarbon as for example perchlorethylene or carbon tetrachloride. These compounds have a higher dielectric constant than air and therefore intensify the action above described.

*Example 3*

A glass tube of desired length is filled with the mixture described in Example 1 and four band form electrodes are applied symmetrically against the tube. The length of the electrodes must be equal at least to the charge within the tube intended to be oriented. The operations are performed as described in Example 1 and a rod results in which the crystal plates are fixed throughout the whole mass perpendicular to the surface of the glass tube. Such a rod can be cut by the machines, usual in the industry, into small discs which constitute a raw material for the production of imitation mother of pearl buttons, discs for use in costume jewelry and so forth. This method also has the advantage that the loss occasioned by stamping discs out of plates of synthetic material is avoided.

*Example 4*

A mixture is made of methylmethacrylate monomer and a suitable catalyst, as for example benzoyl peroxide or azoisobutyronitrile, and a suitable pigment. This mixture is heated to a temperature of say 50 to 80° C. or even higher until a viscous but still pourable pre-polymer is obtained. This pre-polymer is charged into the desired mold and the further procedure is the same as in the previous examples with the difference that polymerization up to final fixing of the crystals must be effected at a moderate temperature.

*Example 5*

The procedure of Example 4 is followed except that a sulphine acid, as for example, benzosulphinic acid or paratoluol sulphinic acid is used as a catalyst. These catalysts enable the polymerization processes to be carried out without an external supply of heat.

The same process as illustrated by Examples 1 to 5 can also be carried out using different castable or polymerizable resins as known in the synthetic material industry. Examples of other resins which can be used include phenolic casting resin and epoxy resin. Many other resins, for example, with solutions or compounds of synthetic materials, which under suitable conditions form gels or harden can also be used.

It is also possible, instead of using fields of alternating polarity, to use fields of constant polarity.

It is also possible by a suitable construction or position of the electrodes to set up the fields in such a way that orientation, other than a parallel orientation is obtained, for example, by the use of curved, apertured, or otherwise fashioned electrodes.

It is further possible, instead of using two crossing fields alternating, to use a greater number of fields which are set up in a suitable fashion in relation to the mold containing the synthetic material.

It is also possible, if desired, to dispense with the use of a plurality of fields and to operate with a single field if the mold containing the synthetic material is rotated from time to time by the aid of a suitable automatic device. It is clear that the same effect will arise as with alternatively applied fields in different directions.

*Example 6*

The procedure is similar to that described in Example 3 but only one pair of electrodes is used. After a certain period of action of the field, the tube containing the synthetic material is rotated through about 90° about its own axis and this procedure is repeated until the crystals are fixed in their position due to the gelling or thickening of the mass.

*Example 7*

It is also possible to carry out the orientation of the iridescent crystals in a self-hardening resin under the influence of magnetic lines of force. In that case, the mold is filled with the self-hardening resin and the crystals are brought between the pole pieces of electromagnets in such a manner that the pole pieces of two electromagnets are so disposed, respectively, that with the on and off switching step of the induction current the magnetic fields of force of the two electromagnets cross each other, similarly to the way this occurs in connection with the establishment of the electrostatic fields mentioned in the previous examples. The field strength should not be below 100 gauss. Preferably the field should be of a strength of 8,000–10,000 gauss. As soon as the self-hardening resin has reached a viscosity of at least 6,000 centipoises or has completely gelled, the induction current can be switched off, as by then the crystals are fixed in a definite retaining position.

What I claim is:

1. A process for the production of resinous objects having light reflecting properties which comprises charging a mixture of an uncured resin and polarizable crystals in which the crystals are free to move into a mold, subjecting the resin mixture contained in the mold to at least two electric fields applied intermittently in sequence at different angles to each other and hardening the resin while continuing the application of the electric fields until the polarizable crystals are immovable therein.

2. The process of claim 1 in which the mold is positioned within a dielectric material.

3. A process for the production of resinous objects having light-reflecting properties which comprises charging a mixture of an uncured resin and polarizable crystals in which the crystals are free to move into a mold, subjecting the resin mixture to at least one electric field, continuously rotating the resin mixture contained in the mold in angular increments along an axis which is transverse to the electric field, and hardening the resin while continuing the application of the electric field to the resin mixture and the rotation of the resin mixture contained in the mold until the polarizable crystals are immovable therein.

4. A cured resin rod from which buttons and jewelry articles can be produced having incorporated therein light reflecting polarizable crystals and in which substantially all of said crystals are fixedly oriented about at least two axes in substantially the same plane and in which the crystals are substantially uniformly distributed throughout the rod.

5. The rod of claim 4 in which the two axes which are in the same plane are both perpendicular to the major axes of the rod.

References Cited in the file of this patent

UNITED STATES PATENTS

| | | |
|---|---|---|
| 1,918,848 | Land et al. | July 18, 1933 |
| 2,265,226 | Clewell et al. | Dec. 9, 1941 |
| 2,346,784 | Pollack | Apr. 18, 1944 |
| 2,584,441 | Fredendull | Feb. 5, 1952 |